US011507848B2

(12) United States Patent
Wang et al.

(10) Patent No.: US 11,507,848 B2
(45) Date of Patent: Nov. 22, 2022

(54) EXPERIENCE-AWARE ANOMALY PROCESSING SYSTEM AND METHOD

(71) Applicant: TCL RESEARCH AMERICA INC., San Jose, CA (US)

(72) Inventors: Haohong Wang, San Jose, CA (US); Xiaobo Ren, San Jose, CA (US); Wenqiang Bo, San Jose, CA (US); Guanghan Ning, San Jose, CA (US); Lifan Guo, San Jose, CA (US)

(73) Assignee: TCL RESEARCH AMERICA INC., San Jose, CA (US)

( * ) Notice: Subject to any disclaimer, the term of this patent is extended or adjusted under 35 U.S.C. 154(b) by 1082 days.

(21) Appl. No.: 15/231,492

(22) Filed: Aug. 8, 2016

(65) Prior Publication Data

US 2018/0039908 A1 Feb. 8, 2018

(51) Int. Cl.
*G06N 5/02* (2006.01)
*G06N 20/00* (2019.01)
*G06N 5/04* (2006.01)
*G08B 25/08* (2006.01)
*G08B 13/196* (2006.01)
*G06N 7/00* (2006.01)

(52) U.S. Cl.
CPC .............. *G06N 5/02* (2013.01); *G06N 5/045* (2013.01); *G06N 7/005* (2013.01); *G06N 20/00* (2019.01);
(Continued)

(58) Field of Classification Search
CPC .................. H04L 67/306; A61B 5/112; A63B 2024/0025; H04W 4/02; H04W 4/029;
(Continued)

(56) References Cited

U.S. PATENT DOCUMENTS

2013/0278414 A1* 10/2013 Sprigg et al. .......... G08B 21/02
340/539.12
2016/0373473 A1* 12/2016 Truong et al. .......... H04L 29/06
2017/0148025 A1* 5/2017 Le et al. ................ G06Q 20/40

FOREIGN PATENT DOCUMENTS

CN 105608642 A 5/2016

OTHER PUBLICATIONS

Helman et al., "A Statistically Based System for Prioritizing Information Exploration Under Uncertainty," IEEE Transactions on Systems, Man, and Cybernetics—Part A: Systems and Humans, vol. 27, No. 4, Jul. 1997 (Year: 1997).*

(Continued)

*Primary Examiner* — Ann J Lo
*Assistant Examiner* — Van C Mang
(74) *Attorney, Agent, or Firm* — Anova Law Group, PLLC

(57) ABSTRACT

An experience-aware anomaly processing system and a method for an experience-aware anomaly processing system are provided. The experience-aware anomaly processing system comprises an anomaly detection module configured to receive geographic location data with corresponding time information of a target object, and analyze target object behavior based on the geographic location data with corresponding time information of the target object; a user feedback module configured to receive user feedback from a user and model user feedback behavior when the user receives an alarm message indicating the target object is abnormal; and a decision module configured to receive user setting from the user, and make a detection decision through fusing target object behavior information corresponding to the target object behavior, user feedback behavior information corresponding to the user feedback behavior, and the user setting.

16 Claims, 5 Drawing Sheets

FIG. 6

(52) U.S. Cl.
CPC ....... *G08B 13/19613* (2013.01); *G08B 25/08* (2013.01)

(58) Field of Classification Search
CPC ....... H04W 4/90; G06Q 50/265; G06N 20/00; G06N 5/045; G06N 7/005; G08B 13/19613

See application file for complete search history.

(56) References Cited

OTHER PUBLICATIONS

Kwon et al., "Climate informed flood frequency analysis and prediction in Montana using hierarchical Bayesian modeling," Geophysical Research Letters, vol. 35, 2008 (Year: 2008).*

Gavriil et al., "An Application of Theoretical Probability Distributions to the Study of PM10 and PM2.5 Time Series in Athens, Greece," Global NEST Journal, vol. 8, No. 3, pp. 241-251, 2006 (Year: 2006).*

Vigliotti et al., Discovery of Anomalous Behavior in Temporal Networks, Social Networks 41, pp. 18-25, (2015) (Year: 2015).*

Buthpitiya, Senaka, et al. "N-gram geo-trace modeling," International Conference on Pervasive Computing. Springer, Berlin, Heidelberg, 2011 (Year: 2011).*

Raginsky, Maxim et al., "Sequential Anomaly Detection in the Presence of Noise and Limited Feedback," IEEE Transactions on Information Theory, vol. 58, No. 8, Aug. 2012 (Year: 2012).*

Wang, X. Rosalind, et al. "Spatiotemporal anomaly detection in gas monitoring sensor networks." European Conference on Wireless Sensor Networks. Springer, Berlin, Heidelberg, 2008. (Year: 2008).*

* cited by examiner

EXPERIENCE-AWARE ANOMALY PROCESSING SYSTEM AND METHOD

FIELD OF THE INVENTION

The present invention relates generally to the field of computer technologies and, more particularly, to an experience-aware anomaly processing system.

BACKGROUND

Public security, which fights against the crimes and provide people a safe community, has become one of the top priorities in people's daily life. More and more Internet of Things (IoT) devices (e.g., wearable devices) and systems (e.g., anomaly detection systems) are emerging in market, which provide an early alarm of abnormal cues and prevent severe consequences through monitoring user behaviors. For example, parents may monitor their children's behavior and prevent kidnapping, and caregivers may monitor the elders, especially those suffer from memory ailments such as Alzheimer's disease. However, most anomaly detection systems only provide an anomaly detection mechanism, while not taking user experience into account. Thus, the current system may send false alarms to the users, or superficially handle an anomaly without sufficiently conveying the degree of dangerousness of a current situation.

According to the present disclosure, it is highly desired to balance the user experience of anomaly notification especially for active objects (e.g., kids) and the anomaly detection mechanism. However, a current anomaly detection system may fail because of lacking accurate information. For example, parents may take their child to doctor from school during normal schooling hours, while the system may generate an alarm to the parents if the system is not aware of such an arrangement. Moreover, a notification frequency is highly desired to be controlled, because no one would like to be bombed with tons of false alarm notifications.

The disclosed systems and methods are directed to solve one or more problems set forth above and other problems.

BRIEF SUMMARY OF THE DISCLOSURE

One aspect of the present disclosure includes an experience-aware anomaly processing system. The experience-aware anomaly processing system comprises an anomaly detection module configured to receive geographic location data with corresponding time information of a target object, and analyze target object behavior based on the geographic location data with corresponding time information of the target object; a user feedback module configured to receive user feedback from a user and model user feedback behavior when the user receives an alarm message indicating the target object is abnormal; and a decision module configured to receive user setting from the user, and make a detection decision through fusing target object behavior information corresponding to the target object behavior, user feedback behavior information corresponding to the user feedback behavior, and the user setting.

One aspect of the present disclosure includes a method for an experience-aware anomaly processing system. The method comprises receiving geographic location data with corresponding time information of a target object; analyzing target object behavior based on the received geographic location data with corresponding time information of the target object; receiving user feedback and user setting from a user; modeling user feedback behavior when the user receives an alarm message indicating the target object is abnormal; and making a detection decision through fusing target object behavior information corresponding to the target object behavior, user feedback behavior information corresponding to the user feedback behavior, and the user setting Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the invention, which are illustrated in the accompanying drawings. Hereinafter, embodiments consistent with the disclosure will be described with reference to drawings. Wherever possible, the same reference numbers will be used throughout the drawings to refer to the same or like parts. It is apparent that the described embodiments are some but not all of the embodiments of the present invention. Based on the disclosed embodiments, persons of ordinary skill in the art may derive other embodiments consistent with the present disclosure, all of which are within the scope of the present invention.

The present disclosure provides an experience-aware anomaly processing system, which may be able to link the user's feedback with the process of anomaly detection and notification, and to provide experience-aware anomaly processing experience to the users. The experience-aware anomaly processing system may include two aspects: human-computer interaction and anomaly detection.

For the human-computer interaction, a user's security factor which is the user's security setting input and a user's feedback factor to count the number of abnormal behavior and normal behavior are introduced. The user's security factor and the user's feedback factor may work together to control the behavior of the system, as well as to balance the notification frequency and security level. An option, donated as O, may also be provided for the user to determine the property of a current event. For the anomaly detection, an improved anomaly detection method based on n-gram model to train user's data and tune the system into best performance and a simple yet effective alarm trigger mechanism are introduced.

Figure 1:
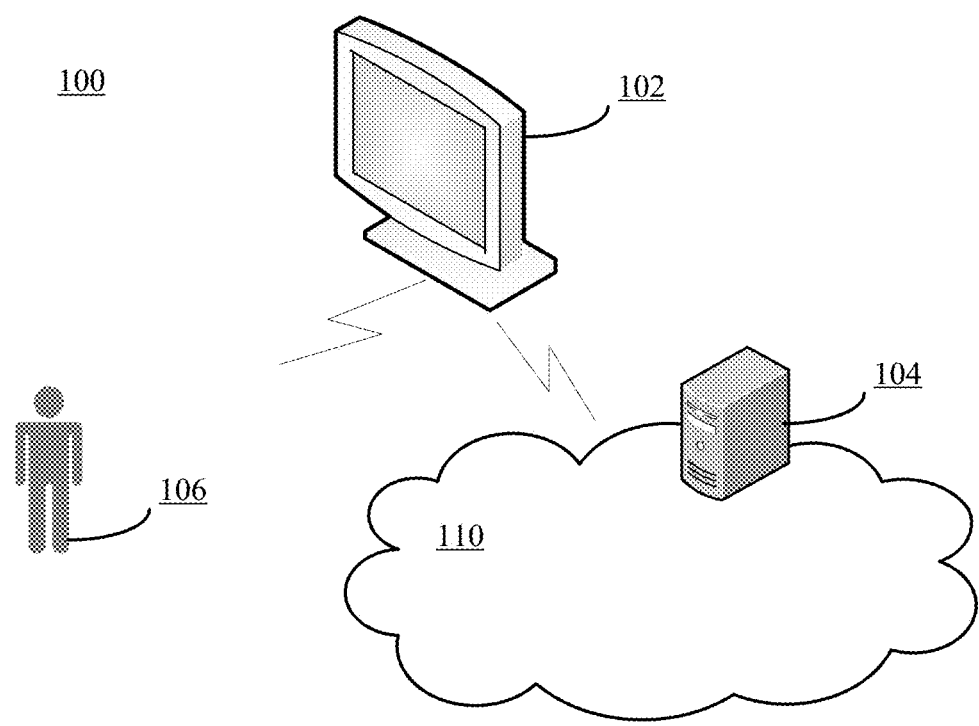
FIG. 1 illustrates an exemplary environment incorporating certain embodiments of the present invention.

FIG. 1 illustrates an exemplary environment 100 incorporating certain embodiments of the present invention. As shown in FIG. 1, the environment 100 may include a user terminal 102, a server 101, a user 106, and a network 110. Other devices may also be included.

The user terminal 102 may include any appropriate type of electronic device with computing capabilities, such as TVs (smart TVs or non-smart TVs), a smart watch, a mobile phone, a smartphone, a tablet, a personal computer (PC), a server computer, a laptop computer, and a digital personal assistant (PDA), etc. Further, the user terminal 102 may be any appropriate content-presentation device capable of presenting texts, images, and videos, etc.

The server 101 may include any appropriate type of server computer or a plurality of server computers for providing personalized contents to the user 106. For example, the server 101 may be a cloud computing server. The server 101 may also facilitate the communication, data storage, and data processing between the other servers and the user terminal 102. The user terminal 102, and server 101 may communicate with each other through one or more communication networks 110, such as cable network, phone network, and/or satellite network, etc.

The user 106 may interact with the user terminal 102 to query and to retrieve various contents and perform other activities of interest, or the user may use voice, hand or body gestures to control the user terminal 102 if speech recognition engines, motion sensor or depth-camera is used by the user terminal 102. The user 106 may be a single user or a plurality of users, such as family members.

Figure 2:
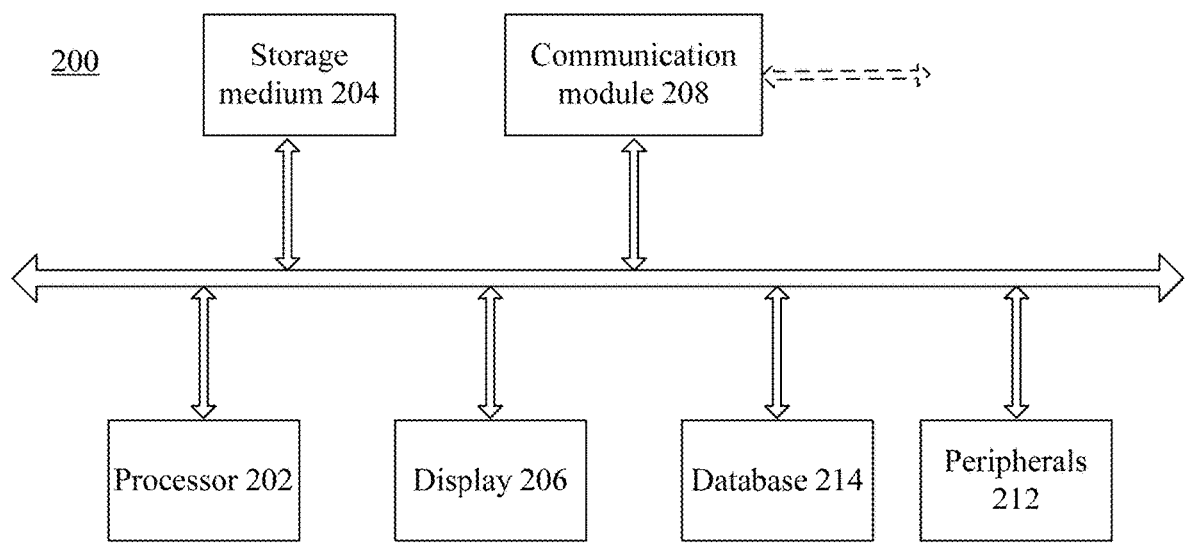
FIG. 2 illustrates an exemplary computing system consistent with disclosed embodiments.

The user terminal 102, and/or server 101 may be implemented on any appropriate computing circuitry platform. FIG. 2 shows a block diagram of an exemplary computing system capable of implementing the user terminal 102, and/or server 101

As shown in FIG. 2, the computing system 200 may include a processor 202, a storage medium 204, a display 206, a communication module 208, a database 214, and peripherals 212. Certain components may be omitted and other components may be included.

The processor 202 may include any appropriate processor or processors. Further, the processor 202 can include multiple cores for multi-thread or parallel processing. The storage medium 204 may include memory modules, such as ROM, RAM, flash memory modules, and mass storages, such as CD-ROM and hard disk, etc. The storage medium 204 may store computer programs for implementing various processes, when the computer programs are executed by the processor 202.

Further, the peripherals 212 may include various sensors and other I/O devices, such as keyboard and mouse, and the communication module 208 may include certain network interface devices for establishing connections through communication networks. The database 214 may include one or more databases for storing certain data and for performing certain operations on the stored data, such as database searching.

Figure 3:
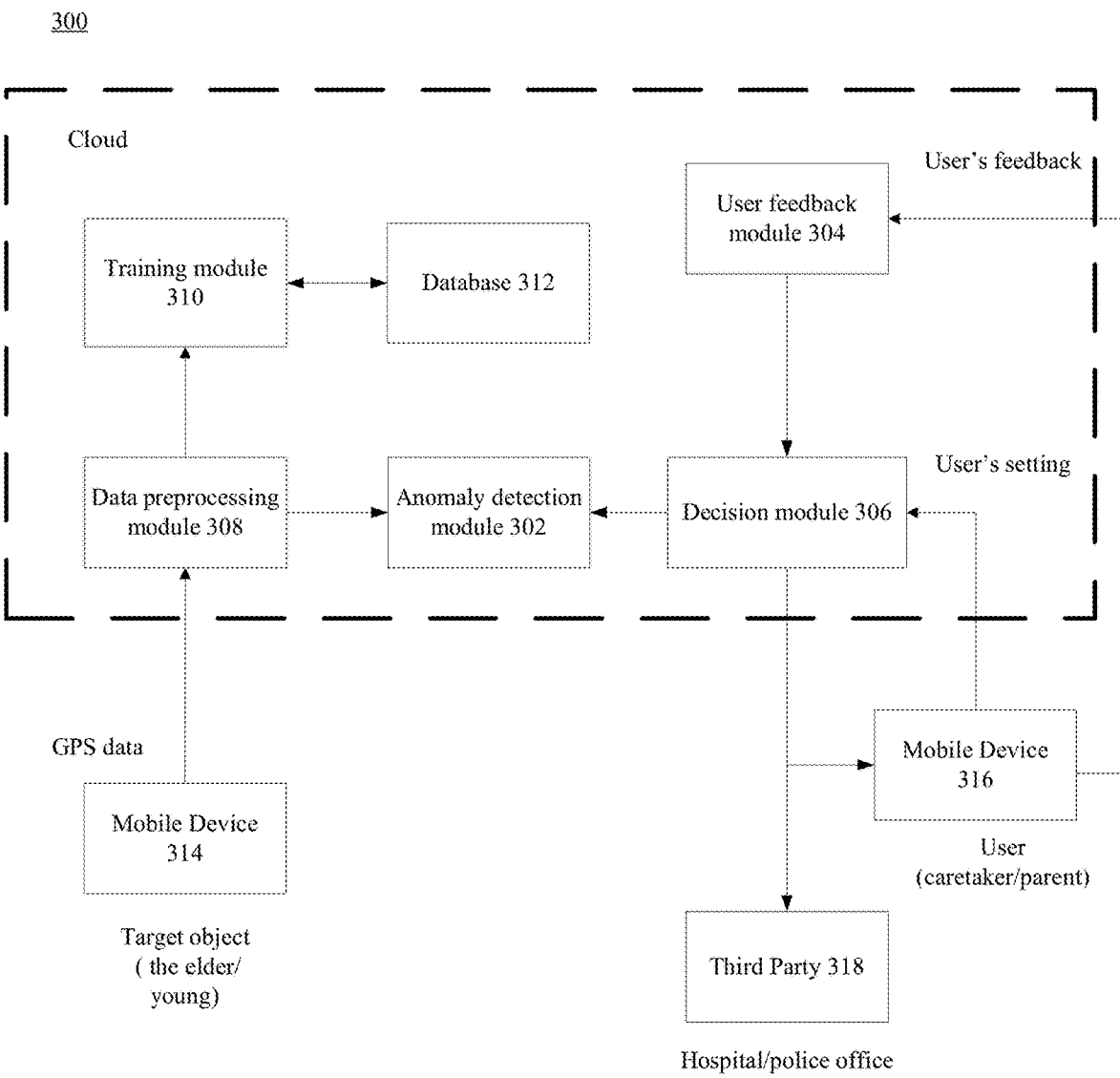
FIG. 3 illustrates an exemplary experience-aware anomaly processing system consistent with disclosed embodiments.

Returning to FIG. 1, the user terminal 102 and/or server 104 may implement the experience-aware anomaly processing system. FIG. 3 illustrates an exemplary experience-aware anomaly processing system 300 consistent with disclosed embodiments. As shown in FIG. 3, the experience-aware anomaly processing system 300 may include an anomaly detection module 302, a user feedback module 304 and a decision module 306. The anomaly detection module 302, the user feedback module 304 and the decision module 306 may be core modules of the experience-aware anomaly processing system 300. In certain embodiments, the experience-aware anomaly processing system 300 may also include a data preprocessing module 308 and a training module 310.

The experience-aware anomaly processing system 300 may monitor one or more target objects (e.g., the elder or the young) and notice the user (e.g., a caretaker or a parent) if any abnormal behavior of the target objects is detected. The target object may carry a mobile device 314 and the user may carry a mobile device 316, such as a smart phone, to communicate with the experience-aware anomaly processing system 300. In one embodiment, a GPS installed on the target object's mobile device may collect geographic location data with corresponding time information of the target object, for example, country, region, city, postal/zip code, latitude, longitude, and time zone, etc. The geographic location data with corresponding time information of the target object is also called as geographic location data with corresponding time information in the following.

The data preprocessing module 308 may be configured to receive the geographic location data with corresponding time information from the target object and preprocess the received data. For example, the geographic location data with corresponding time information received from the target object may be raw data, and the data preprocessing module 308 may transform the received raw data into an understandable format, because real-world raw data is often incomplete, inconsistent, and/or lacking in certain behaviors or trends, and is likely to contain many errors. The data preprocessing module 308 may also be configured to send the geographic location data with corresponding time information to the anomaly detection module 302 and the training module 310.

Based on the received geographic location data with corresponding time information, the training module 310 may be configured to learn a corresponding model (i.e., a corresponding event) using training data in the database. The training data in the database may be normal events collected from normal system operation, for example, normal geographic location data with corresponding normal time information of the target object.

The anomaly detection module 302 may be configured to receive the geographic location data with corresponding time information and analyze a real target object location based on a continuous geographic data collection. That is, the anomaly detection module 302 may be configured to analyze target object behavior based on the received geographic location data with corresponding time information and generate target object behavior information corresponding to the target object behavior.

Further, the anomaly detection module 302 may also be configured to find a pattern of the geographic location data that does not conform to an expected behavior of the target object. Based on the geographic location data with corresponding time information, the anomaly detection module 302 may be configured to apply various algorithms to estimate the target object's daily track. Then for each reported location of the target object at time t, the anomaly detection module may be able to predict an abnormal probability of the target object. The anomaly detection module 302 may also be figured to send the target object behavior information to the decision module 306.

The user feedback module 304 may be an important component for analyzing the user behavior and improve the user experience. The user feedback module 304 may be configured to model user response behavior or feedback behavior when the user receives an alarm message indicating the target object is abnormal. For example, the user may carry a mobile device, which may receive the alarm message. If the user considers the alarm message to be true, the user may call the target object or a police office. If the user considers the alarm message to be false, the user may not take any actions.

The mobile device may track or record the various actions taken by the user, i.e., the mobile device may record the user feedback behavior corresponding to various alarm messages, and send the user feedback behavior to the user feedback module 304. Through collecting various user feedback behavior, the user feedback behavior may be predicted to avoid false alarms. The user feedback module 304 may also be configured to generate user feedback behavior information corresponding to the user feedback behavior, and send the user feedback behavior information to the decision module 306.

Figure 4:
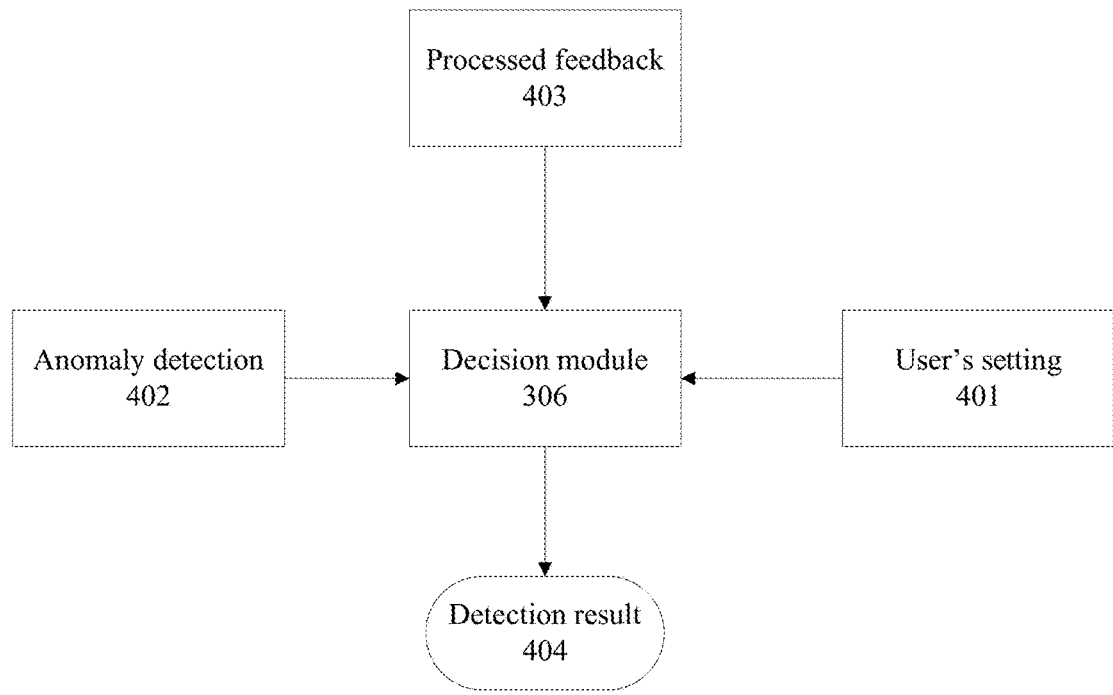
FIG. 4 illustrates an exemplary adaptive anomaly decision module consistent with disclosed embodiments.

The decision module 306 may be the "brain" of the experience-aware anomaly processing system 300, and all "sensor data" may be sent to the decision module 306. FIG. 4 illustrates an exemplary adaptive anomaly decision module consistent with disclosed embodiments. As shown in FIG. 4, user's setting 401, anomaly detection 402 (i.e. the target object behavior information, and processed feedback 403 (i.e., the user feedback behavior information) may be sent to the decision module 306. After processing the received "sensor data", the decision module 306 may output detection results 404.

In one embodiment, referring to FIG. 3, the user may input the user's setting to the decision module 306 through the mobile device 316. The user's setting may include a user preference setting that determines the property of the current event whether it is a routine activity or occasional activity. The user's setting may also initialize the alarm threshold. Meanwhile, the target object behavior information and the user feedback behavior information may be sent to the decision module 306 from the anomaly detection module 302 and the user feedback module 304, respectively.

Further, the decision module 306 may be configured to fuse the analysis of target object behavior information, the user feedback behavior information, and the user setting to make an intelligent decision, i.e., whether to alarm/warn the user or not. In addition to sending the alarm or the waring to the user, the decision module 306 may also send the alarm or the waring to a third party 318, such as a hospital, a police office, a fire station, etc. Thus, the third party may take prompt actions in case there is any emergency.

Figure 5:
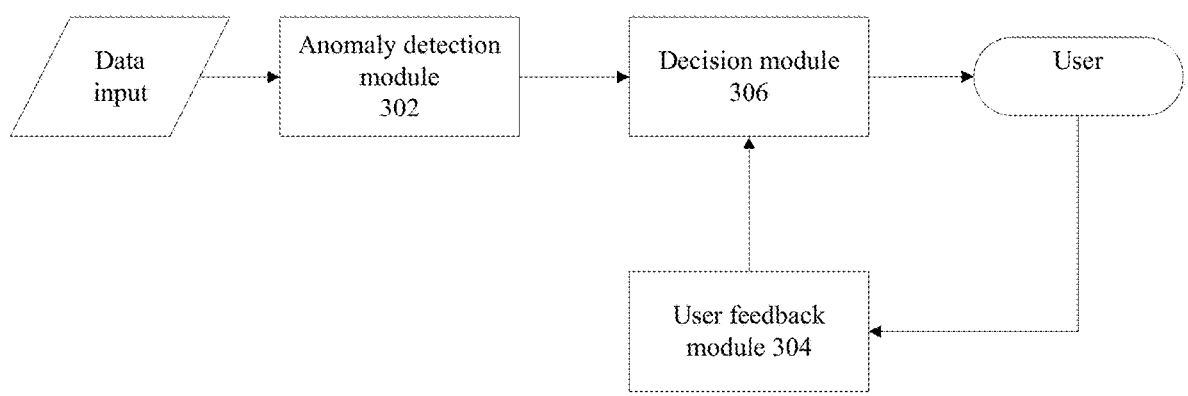
FIG. 5 illustrates an exemplary user experience enhanced adaptive anomaly detection system consistent with disclosed embodiments.

In particular, the three core modules of the experience-aware anomaly processing system 300, i.e., the anomaly detection module 302, the user feedback module 304, and the decision module 306, may form a user experience enhanced adaptive anomaly detection system. FIG. 5 illustrates an exemplary user experience enhanced adaptive anomaly detection system consistent with disclosed embodiments. The functions of the anomaly detection module 302, the user feedback module 304, and the decision module 306 shown in FIG. 5 may be similar to the corresponding modules shown in FIG. 3, which are not repeated here.

Figure 6:
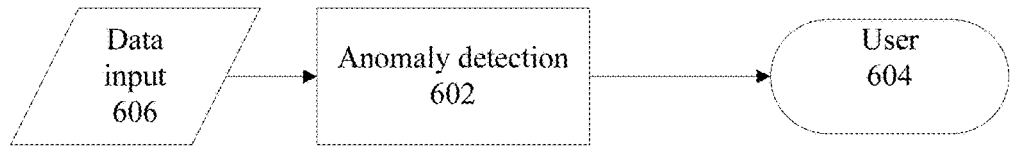
FIG. 6 illustrates a traditional anomaly detection system.

FIG. 6 illustrates a traditional anomaly detection system. As shown in FIG. 6, the traditional anomaly detection system often includes an anomaly detection module 602 only. The anomaly detection module receives input data 606, for example, the geographic location data of the target object. Based on the input data, the anomaly detection module determines whether to warn the user 604 or not, and sends the alarm to the user 604. Thus, the traditional anomaly detection system may only provide an anomaly detection, while not taking the user experience into account.

Compared to the traditional anomaly detection system, the disclosed user experience enhanced adaptive anomaly detection system may include the user feedback module and the decision module in addition to the anomaly detection module. In particular, the user feedback module may provide the possibility for user to participate in the target object anomaly decision process, and the decision module may intelligently alarm user by analyzing both user and target object behavior. Thus, each user may be able to enjoy unique and enhanced experience based on their preference.

That is, the disclosed user experience enhanced adaptive anomaly detection system may emphasize the importance of user's feedback and treat the user's feedback as an important input of the anomaly detection system, such that false alarm rate may be reduced, and the user experience may be significantly enhanced. The alarm level of the anomaly detection system may be determined by the user's preference and may be even adaptable and changeable during the anomaly detection process. Thus, the false alarm rate may be reduced, and the user experience may be significantly enhanced. The anomaly detection module 302 and the decision module 306 shown in FIG. 3 and FIG. 5 may also be called as an adaptive anomaly detection module 302 and an adaptive decision module 306, respectively.

Figure 7:
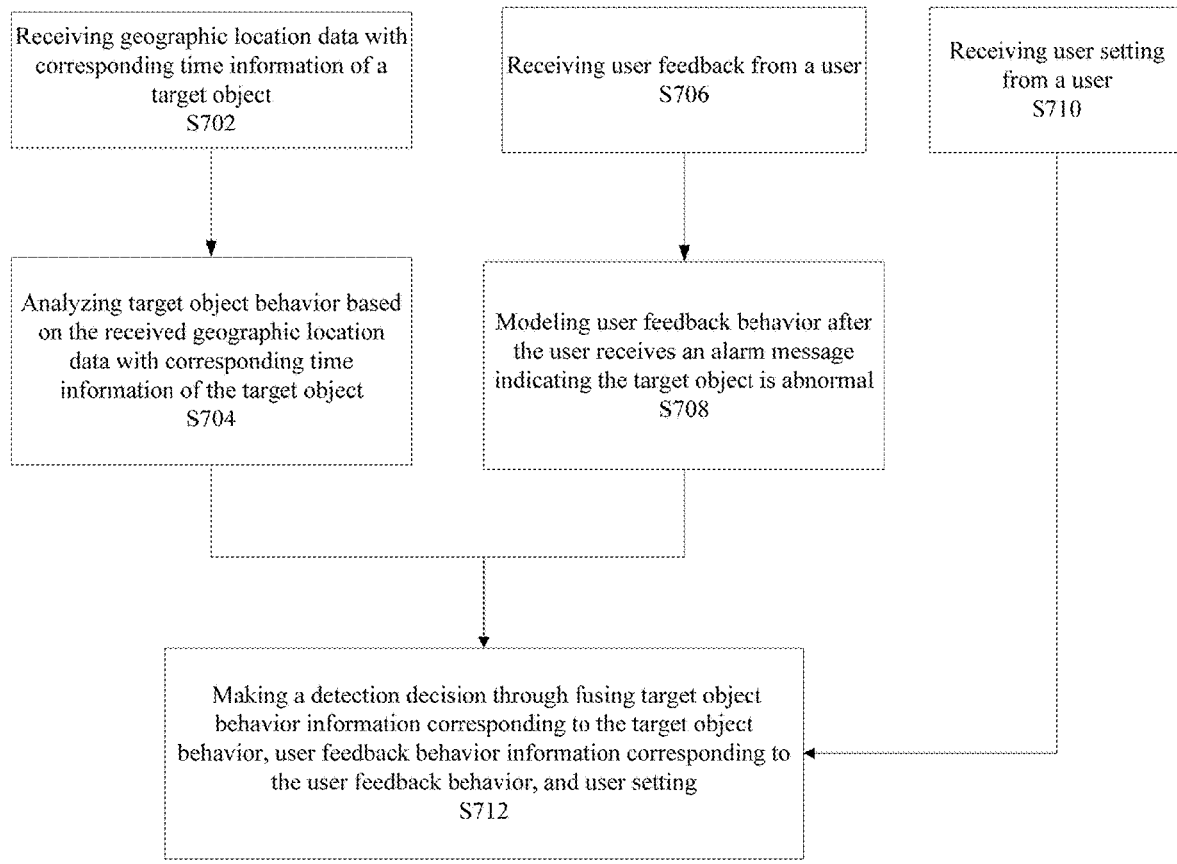
FIG. 7 illustrates a flow chart of an exemplary experience-aware anomaly processing method consistent with disclosed embodiments.

FIG. 7 illustrates a flow chart of an exemplary experience-aware anomaly processing method consistent with disclosed embodiments. Given a target object location, the experience-aware anomaly processing method may determine whether to send an alarm to the user or not, according to the user feedback.

As shown in FIG. 7, at the beginning, the anomaly detection module may receive geographic location data with corresponding time information of the target object (S702), and analyze target object behavior based on the received geographic location data with corresponding time information of the target object (S704). The target object behavior information corresponding to the target object behavior may be generated.

In particular, based on the geographic location data with corresponding time information of the target object, the anomaly detection module 302 may apply various techniques or algorithms to estimate the target object's daily track. In one embodiment, n-gram module may be adopted. N-gram module is a technique widely used in nature language processing, in which any sentence can be considered as a sequence of words. The n-gram model may be adopted in the anomaly detection by assuming that the sequence of target object's location may also be approximated by n consecutive locations form the past. Given previous n−1 locations from the target object's geo-trace and the anomaly probability of current location may be estimated.

The target object's location may be denoted as $D(x_t, y_t)$, where $x_t$ is the x-coordinate at time t, $y_t$ is the y-coordinate at time t. The probability of anomaly behavior at time t, is denoted as $P(D(x_t, y_t))$. According to the definition of the n-gram model, the anomaly probabilities $P(D(x_t, y_t)$ at time t may be estimated from the training data. Assume $C(\{D(x_{t-n}, y_{t-n}), D(x_{t-n+1}, y_{t-n+1}) \ldots, D(x_t, y_t)\})$ is the number of the elements in collected data which equals to the input location sequence $\{D(x_{t-n}, y_{t-n}), D(x_{t-n+a}, y_{t-n+1}) \ldots, D(x_t, y_t)\}$. Then the anomaly probabilities $P(D(x_t, y_t))$ at time t may be calculated by the following equation (1).

$$P(D(x_t, y_t)) = \frac{C(\{D(x_{t-n}, y_{t-n}), D(x_{t-n+1}, y_{t-n+1}), \ldots, D(x_t, y_t)\})}{C(\{D(x_{t-n}, y_{t-n}), D(x_{t-n+1}, y_{t-n+1}), \ldots, D(x_{t-1}, y_{t-1})\})} \quad 1)$$

On the other hand, the user feedback module may receive user feedback from a user (S706) and model user response behavior or feedback behavior when the user receives an alarm message indicating the target object is abnormal (S708). User feedback behavior information corresponding to the user feedback behavior may be generated. The user feedback behavior information may be witch accumulated user feedback information.

In particular, the user feedback module may generate an adaptive threshold function $G(\theta_t)$, where $\theta_t$ is a threshold at time t to make the detection decision. The adaptive threshold function $G(\theta_t)$ may provide an adaptive threshold for the system based on the user's previous feedback, and decide at time t whether the system should notify the user of the anomaly or not. Thus, the adaptive threshold function $G(\theta_t)$ may directly impact on the total number of notifications received by the user.

Further, based on the received user feedback, the adaptive threshold function $G(\theta_t)$ may keep updated during the anomaly detection process. Thus, the alarm level may be adaptively updated and the false alarm rate may be reduced accordingly, which may significantly enhance the user experience.

The threshold function $G(\theta_t)$ at time t is defined as:

$$G(\theta_t) = \gamma \theta_t \quad (2)$$

where $\gamma$ is security factor set by the user, for example, $\gamma$ may be 0.3, 0.6 or 1 corresponding to a high, normal and low security level. The threshold $\theta_t$ at time t may be calculated to minimize the predicted anomaly probability, denoted as $P(\theta_t|DATA)$, based on history data. The predicted anomaly probability $P(\theta_t|DATA)$ may be calculated by the following equation (3)

$$P(\theta_t | DATA) = \frac{P(DATA | \theta_t) P(\theta_t)}{\rho} \quad (3)$$

where $\rho$ is a constant value, DATA={$data_1, data_2, \ldots, data_t$} is the history data containing target object's previous locations and the user's previous feedbacks, $data_t$=(D $(x_t, y_t)$, $(\alpha_t, \beta_t)$), $D(x_t, y_t)$ is target object's location, $(\alpha_t, \beta_t)$ is user's feedback at time t, $\alpha_t$ is the count of target object's abnormal behavior observed by the user by time t, $\beta_t$ is the count of target object's normal behavior observed by the user by time t, and $\theta_t$ is the threshold at time t. Then the predicted anomaly probability $P(\theta_t|DATA)$ may be expressed as $$P(\theta_t|DATA) \propto P(DATA|\theta_t) P(\theta_t) \quad (4)$$

Assume $P(\theta_t)$ is subject to beta distribution, as expressed by Equation (5), $$P(\theta_t) = \frac{(1-\theta_t)^{\beta_t - 1} \theta_t^{\alpha_t}}{B(\alpha_t, \beta_t)} \quad 5)$$

$B(\alpha_t, \beta_t)$ is a beta function, as expressed by Equation (6), $$B(\alpha_t, \beta_t) = \frac{(\alpha_t - 1)!(\beta_t - 1)!}{(\alpha_t + \beta_t - 1)!} \quad (6)$$

$P(DATA|\theta_t)$ is subject to Bernoulli distribution, as expressed by Equation (7), $$P(DATA|\theta_t) \propto \theta_t^z (1-\theta_t)^{N-z} \quad 7)$$

where N is the total number of data and z represents the time of anomaly behavior observed by system.

Equation (3), (4), (5), (6), and (7) may be combined to get the final expression for $P(\theta_t|DATA)$, as expressed by Equation (8), $$P(\theta_t | DATA) \propto \frac{(\alpha_t + \beta_t - 1)!}{(\alpha_t - 1)!(\beta_t - 1)!} \theta_t^{z+\alpha_t}(1-\theta_t)^{N-z+\beta_t-1} \quad (8)$$

Further, $P(\theta_t|DATA)$ w.r.t. $\theta_t$ may be optimized, and $\theta_t$ may be computed when $P(\theta_t|DATA)$ is minimized. Then $\theta_t$ may be adopted in the adaptive threshold function $G(\theta_t)$, determining the current behavior is abnormal or normal.

Meanwhile, the decision module may receive the user setting from the user (S710). The user's setting may include a user preference setting that determines the property of the current event whether it is a routine activity or occasional activity. The user's setting may also initialize the alarm threshold.

After the target object behavior information is analyzed, the user feedback behavior is modeled and the user setting is received, the decision module may fuse the target object behavior information, the user feedback behavior information, and the user setting to make an intelligent detection decision, i.e., whether to alarm/warn the user or not (S712). If the decision module considers the target object's behavior is abnormal, a corresponding notification may be sent to the use.

In particular, the decision module may receive the anomaly probabilities $P(D(x_t, y_t))$ at time t from the anomaly detection module, and the threshold function $G(\theta_t)$ at time t from the user feedback module. Then the decision module may generate an anomaly value at time t, donate as $V_t$, through comparing the anomaly probabilities $P(D(x_t, y_t))$ at time t and the threshold function $G(\theta_t)$ at time t. The value of $V_t$ may indicate whether the anomaly detection system needs to send a notification to the user.

The anomaly value at time t $V_t$, is computed by Equation (9):

$$V_t = \begin{cases} 1, & \text{if } P(D(x_t, y_t)) > G(\theta_t) \\ 0, & \text{if } P(D(x_t, y_t)) \leq G(\theta_t) \end{cases} \quad (9)$$

When $V_t=1$, the anomaly detection system may consider the target object's behavior is abnormal, thus, send a notification to the user. When $V_t=0$, the anomaly detection system may consider the target object's behavior is normal and may not send a notification to the user.

In certain embodiments, before receiving geographic location data with corresponding time information of the target object and analyzing the target object behavior information based on the received geographic location data with corresponding time information of the target object by the anomaly detection module, the experience-aware anomaly processing method may also include receiving the geographic location data with time information from the target object, preprocessing the received geographic location data, and sending the preprocessed geographic location data to the anomaly detection module, by the data preprocessing module.

The experience-aware anomaly processing method may also include receiving the processed geographic location data and learning a corresponding model (i.e., a corresponding event) using the training data in the database, by the training module. The training data in the database may be normal events collected from normal system operation, for example, normal geographic location data with correspond normal time information of the target object.

After making the detection decision by the decision module, the experience-aware anomaly processing method may also include sending the detection decision to a third party, such as a hospital, a police office, a fire station, etc.

As the aging population keeps increasing and pace of life in today's world grows fast, an intelligent monitoring and anomaly detection is highly desired. The disclosed experience-aware anomaly processing system may provide a unified framework for an anomaly detection with a user feedback module and an adaptive anomaly detection module. The disclosed experience-aware anomaly processing system may be more personal than ever. For example, the user may have more freedom to decide when and how the alarm is triggered and which actions should be taken. Further, the disclosed experience-aware anomaly processing system may also process different events with different strategies, such that an occasional event may be easily and accurately handled without sending a false alarm. Thus, the user may be less interrupted while the anomaly detection may be maintained at a substantially high rate.

The disclosed experience-aware anomaly processing system and method may have a large variety of applications, such as anomaly behavior detection of the elder and the young, anti-theft system, data security, and bank fraud, etc. Because of the powerful prediction, the disclosed experience-aware anomaly processing system and method may even be used for smart houses, for example, pre-heating the house before the user arrives.

Those of skill would further appreciate that the various illustrative modules and method steps disclosed in the embodiments may be implemented as electronic hardware, computer software, or combinations of both. To clearly illustrate this interchangeability of hardware and software, various illustrative units and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The description of the disclosed embodiments is provided to illustrate the present invention to those skilled in the art. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An experience-aware anomaly processing system comprising one or more processors, a memory, the memory storing one or more program units, wherein the one or more processors, when executing the one or more program units, are configured to:

receive geographic location data with corresponding time information of a target object;

analyze target object behavior based on the geographic location data with corresponding time information of the target object, including generating an anomaly probability of the target object at time t according to a n-gram model that calculates a probability of the target object being at a current location given an ordered sequence of previous n−1 consecutive locations of the target object, the n-gram model being trained according to normal geographic location data with corresponding normal time information of the target object;

receive user feedback from a user;

model user feedback behavior when the user receives an alarm message indicating the target object is abnormal;

receive user setting from the user, the user setting including a security factor y for an adaptive threshold function $G(\theta_t)$, the threshold function having a form of $G(\theta_t)=y\theta_t$, $\theta_t$ being a threshold at time t;

calculate and update the threshold $\theta_t$ by minimizing a predicted anomaly probability according to history data, the target object behavior and the user feedback by time t, wherein the predicted anomaly probability $P(\theta_t|DATA)$ is calculated by $$P(\theta_t \mid DATA) = \frac{P(DATA \mid \theta_t)P(\theta_t)}{\rho} = P(\theta_t \mid DATA) \propto P(DATA \mid \theta_t)P(\theta_t),$$

where $\rho$ is a constant value, DATA={data$_1$, data$_2$, ..., data$_t$} is the history data containing target object's previous locations and user's previous feedbacks, data$_t$=(D(x$_t$, y$_t$), ($\alpha_t$, $\beta_t$)), D(x$_t$, y$_t$) is target object's location corresponding to time t, ($\alpha_t$, $\beta_t$) is based on user's feedback at time t, $\alpha_t$ is a count of target object's abnormal behavior observed by the user by time t corresponding to the target object's location D(x$_t$, y$_t$), and $\beta_t$ is a count of target object's normal behavior observed by the user by time t corresponding to the target object's location D(x$_t$, y$_t$); and make a detection decision according to the anomaly probability of the target object, the threshold function $G(\theta_t)$, and the user setting.

2. The experience-aware anomaly processing system according to claim 1, wherein the one or more processors are further configured to:

receive raw geographic location data with corresponding raw time information of the target object from the target object, and preprocess the raw geographic location data with the corresponding raw time information of the target object to get the geographic location data with the corresponding time information of the target object.

3. The experience-aware anomaly processing system according to claim 2, wherein the one or more processors are further configured to:

train the n-gram model corresponding to the geographic location data with the corresponding time information of the target object based on training data stored in a database.

4. The experience-aware anomaly processing system according to claim 3, wherein:

the training data stored in the database includes the normal geographic location data with the corresponding normal time information of the target object.

5. The experience-aware anomaly processing system according to claim 1, wherein:
the anomaly probability of the target object at time t has a form of $$P(D(x_t, y_t)) = \frac{C(\{D(x_{t-n}, y_{t-n}), D(x_{t-n+1}, y_{t-n+1}), \ldots, D(x_t, y_t)\})}{C(\{D(x_{t-n}, y_{t-n}), D(x_{t-n+1}, y_{t-n+1}), \ldots, D(x_{t-1}, y_{t-1})\})},$$

where $D(x_t, y_t)$ is the target object's location, $x_t$ is x-coordinate at time t, $y_t$ is y-coordinate at time t, $\{D(x_{t-n}, y_{t-n}), D(x_{t-b+1}, y_{t-n+1})0 \ldots, D(x_t, y_t)\}$ is a sequence of the geographic location data of the target object, $C(\{D(x_{t-n}, D(x_{t-n+1}, y_{t-n+1}) \ldots, D(x_t, y_t)\})$ is number of elements in $\{D(x_{t-n}, y_{t-n}), D(x_{t-n+1}, y_{t-n+1}) \ldots, D(x_t, y_t)\}$, and n is a positive integer larger than 1.

6. The experience-aware anomaly processing system according to claim 1, wherein:
$P(\theta_t)$ is a Beta distribution, and $$P(\theta_t) = \frac{(1-\theta_t)^{\beta_t-1}\theta_t^{\alpha_t}}{B(\alpha_t, \beta_t)};$$

$\beta(\alpha_t, \beta_t)$ is a Beta function, and $$B(\alpha_t, \beta_t) = \frac{(\alpha_t-1)!(\beta_t-1)!}{(\alpha_t+\beta_t-1)!};$$

and
$P(DATA|\theta_t)$ is a Bernoulli distribution, and $P(DATA|\theta_t) \propto \theta_t^z(1-\theta_t)^{N-z}$;
where N is a total number of data and z represents a time of the target object's anomaly behavior observed by the experience-aware anomaly processing system.

7. The experience-aware anomaly processing system according to claim 6, wherein:

$$P(\theta_t|DATA) \propto \frac{(\alpha_t+\beta_t-1)!}{(\alpha_t-1)!(\beta_t-1)!}\theta_t^{z+\alpha_t}(1-\theta_t)^{N-z+\beta_t-1}.$$

8. The experience-aware anomaly processing system according to claim 7, wherein the one or more processors are further configured to:
generate an anomaly value at time t, donate as $V_t$, through comparing the anomaly probabilities $P(D(x_t, y_t))$ at time t and the threshold function $G(\theta_t)$ at time t, wherein:

$$V_t = \begin{cases} 1, & \text{if } P(D(x_t, y_t)) > G(\theta_t) \\ 0, & \text{if } P(D(x_t, y_t)) \le G(\theta_t) \end{cases}$$

when $V_t=1$, determine that the target object's behavior is abnormal and send a notification to the user, and
when $V_t=0$, determine that the target object's behavior is normal and does not send a notification to the user.

9. A method for an experience-aware anomaly processing system, comprising:
receiving geographic location data with corresponding time information of a target object;
analyzing target object behavior based on the received geographic location data with corresponding time information of the target object, including generating an anomaly probability of the target object at time t according to a n-gram model that calculates a probability of the target object being at a current location given an ordered sequence of previous n−1 consecutive locations of the target object, the n-gram model being trained according to normal geographic location data with corresponding normal time information of the target object;
receiving user feedback and user setting from a user, the user setting including a security factor y for an adaptive threshold function $G(\theta_t)$, the threshold function having a form of $G(\theta_t)=y\theta_t$, $\theta_t$ being a threshold at time t;
modeling user feedback behavior when the user receives an alarm message indicating the target object is abnormal;
calculating and updating the threshold $\theta_t$ by minimizing a predicted anomaly probability according to history data, the target object behavior and the user feedback by time t, wherein the predicted anomaly probability $P(\theta_t|DATA)$ is calculated by $$P(\theta_t|DATA) = \frac{P(DATA|\theta_t)P(\theta_t)}{\rho} = P(\theta_t|DATA) \propto P(DATA|\theta_t)P(\theta_t),$$

where $\rho$ is a constant value, DATA={data$_1$, data$_2$, ..., data$_t$} is the history data containing target object's previous locations and user's previous feedbacks, data$_t$=($D(x_t, y_t)$, ($\alpha_t, \beta_t$)), $D(x_t, y_t)$ is target object's location corresponding to time t, ($\alpha_t, \beta_t$) is based on user's feedback at time t, $\alpha_t$ is a count of target object's abnormal behavior observed by the user by time t corresponding to the target object's location $D(x_t, y_t)$, and $\beta_t$ is a count of target object's normal behavior observed by the user by time t corresponding to the target object's location $D(x_t, y_t)$; making a detection decision the anomaly probability of the target object, the threshold function $G(\theta_t)$, and the user setting.

10. The method for an experience-aware anomaly processing system according to claim 9, further including:
receiving raw geographic location data with corresponding raw time information of the target object from the target object; and
preprocessing the raw geographic location data with the corresponding raw time information of the target object to get the geographic location data with the corresponding time information of the target object.

11. The method for an experience-aware anomaly processing system according to claim 10, further including:
train the n-gram model corresponding to the geographic location data with the corresponding time information of the target object based on training data stored in a database.

12. The method for an experience-aware anomaly processing system according to claim 11, wherein:
the training data stored in the database includes the normal geographic location data with the corresponding normal time information of the target object.

13. The method for an experience-aware anomaly processing system according to claim 9, wherein:
the anomaly probability of the target object at time t has the form $$P(D(x_t, y_t)) = \frac{C(\{D(x_{t-n}, y_{t-n}), D(x_{t-n+1}, y_{t-n+1}), \ldots, D(x_t, y_t)\})}{C(\{D(x_{t-n}, y_{t-n}), D(x_{t-n+1}, y_{t-n+1}), \ldots, D(x_{t-1}, y_{t-1})\})},$$

where $D(x_t, y_t)$ is the target object's location, $x_t$ is x-coordinate at time t, $y_t$ is y-coordinate at time t, $\{D(x_{t-n}, y_{t-n}), D(x_{t-n+1}, y_{t-n+1}) \ldots, D(x_t, y_t)\}$ is a sequence of the geographic location data of the target object, $C(\{D(x_{t-n}, y_{t-n}), D(x_{t-n+1}, y_{t-n+1}) \ldots, D(x_t, y_t)\})$ is number of elements in $\{D(x_{t-n}, y_{t-n}), D(x_{t-n+1}, y_{t-n+1}) \ldots, D(x_t, y_t)\}$, and n is a positive integer larger than 1.

14. The method for an experience-aware anomaly processing system according to claim 9, wherein:
$P(\theta_t)$ is subject to beta distribution, and $$P(\theta_t) = \frac{(1-\theta_t)^{\beta_t-1}\theta_t^{\alpha_t}}{B(\alpha_t, \beta_t)};$$

$B(\alpha_t, \beta_t)$ is a beta function, and $$B(\alpha_t, \beta_t) = \frac{(\alpha_t-1)!(\beta_t-1)!}{(\alpha_t+\beta_t-1)!};$$

and
$P(DATA|\theta_t)$ is subject to Bernoulli distribution, and $P(DATA|\theta_t) \propto \theta_t^z(1-\theta_t)^{N-z}$;
where N is a total number of data and z represents a time of the target object's anomaly behavior observed by the experience-aware anomaly processing system.

15. The method for an experience-aware anomaly processing system according to claim 14, wherein:

$$P(\theta_t|DATA) \propto \frac{(\alpha_t+\beta_t-1)!}{(\alpha_t-1)!(\beta_t-1)!}\theta_t^{z+\alpha_t}(1-\theta_t)^{N-z+\beta_t-1}.$$

16. The method for an experience-aware anomaly processing system according to claim 15, wherein making a detection decision through fusing target object behavior information corresponding to the target object behavior, user feedback behavior information corresponding to the user feedback behavior, and the user setting further includes:
generating an anomaly value at time t, donate as $V_t$, through comparing the anomaly probabilities $P(D(x_t, y_t))$ at time t and the threshold function $G(\theta_t)$ at time t, wherein $$V_t = \begin{cases} 1, & \text{if } P(D(x_t, y_t)) > G(\theta_t) \\ 0, & \text{if } P(D(x_t, y_t)) \leq G(\theta_t) \end{cases},$$

when $V_t=1$, determining that the target object's behavior is abnormal and send a notification to the user, and
when $V_t=0$, determining that the target object's behavior is normal and does not send a notification to the user.

* * * * *